United States Patent Office 2,832,719
Patented Apr. 29, 1958

2,832,719

NYSTATIN PURIFICATION

John Vandeputte, Milltown, N. J., assignor to Olin Mathieson Chemical Corporation, a corporation of Virginia No Drawing. Application March 22, 1956
Serial No. 573,084

4 Claims. (Cl. 167—65)

The present invention relates to the antifungal antibiotic nystatin (originally termed fungicidin) and more specifically to improved processes of preparing highly purified crystalline nystatin.

Nystatin and its method of preparation are described in the copending application of Hazen and Brown, Serial No. 208,978, filed January 12, 1951, now Patent No. 2,797,183. See also Hazen et al., "Fungicidin, an Antibiotic Produced by a Soil Actinomycete," Proc. Soc. Exptl. Biol. Med. 76, 93 (1950). The recovery of nystatin by isopropanol extraction of the whole broth resulting from the fermentation of the nystatin producing *Streptomyces noursei* is described in the copending application of Vandeputte and Gold, Serial No. 466,952, filed November 4, 1954, now Patent No. 2,786,781. The partially purified product obtained by the Vandeputte and Gold process is a therapeutically useful product of about 65–70% purity. At best, however, it is only partially crystalline and for the most part is substantially non-crystalline or amorphous in character. The purification of nystatin employing methanolic-calcium chloride is also described in the copending application of Dutcher and Vandeputte, Serial No. 480,278, filed on January 6, 1955. The product obtained by the Dutcher and Vandeputte process is a therapeutically useful highly refined product substantially crystalline in character.

It is known that pure crystalline nystatin is indicated for certain uses in the antifungal field and attempts have been made to develop improved, simplified processes of obtaining the pure crystalline material in high yield. Attempts in particular have been made to prepare pure crystalline nystatin directly from the relatively crude partially purified plant material obtained by isopropanol extraction of the whole broth by the use of this material in the methanolic calcium chloride process. In the past, with the processes available, this approach has not been found to be entirely satisfactory or completely successful as the product obtained was seldom uniform and was also frequently contaminated by amorphous material. With continued investigation, I discovered that the crude partially purified plant material could be readily converted to highly purified uniform crystalline nystatin of the type desired by a two-step process involving (1) a preliminary treatment of the crude partially purified plant material with a sequestering agent such as sodium hexametapyrophosphate followed (2) by a treatment of the resulting material with a modified methanolic calcium chloride process. The sodium hexametapyrophosphate along with a method of preparing the same are described in Mackenzie Patent No. 2,574,047, dated November 6, 1951.

The following examples will serve to illustrate the invention.

EXAMPLE I

*General process.—Step 1*

In this step, partially purified nystatin e. g. of about 60–75% purity, is slurried in an aqueous water miscible organic solvent mixture containing a small amount of sodium hexametapyrophosphate. The resulting slurry is preferably warmed with agitation up to at least about 40° C., after which it is preferably cooled below room temperature and the resulting crystalline nystatin recovered by centrifugation or the like. The preferred aqueous-organic solvent mixture is an aqueous isopropanol mixture containing about 20–40% by volume of isopropanol employed in amounts sufficient to provide about 5–10 ml. of aqueous isopropanol to one wet gram of the partially purified plant nystatin as recovered by extraction of the fermentation broth.

The amount of sodium hexametapyrophosphate can vary from about 0.3 to 3.0% (w./v.) or more although the use of larger amounts over and above about 0.5–1.0% are not accompanied by any appreciable additional beneficial results. For particular operations the optimum amount of sequestering agent can be readily ascertained by preliminary test.

*Specific example.—Step 1*

About 1000 grams of wet crude partially purified nystatin of about a 65–70% purity (on a dry basis) as obtained by the process described in the copending Vandeputte and Gold application, Serial No. 466,952, noted above, is first slurried in about 10,000 ml. of 20% aqueous isopropanol containing about 0.5% sodium hexametapyrophosphate (w./v.). The temperature of the resulting slurry is next raised to about 60° C. and maintained at this temperature with mild agitation for about 0.5 hour. The warm slurry is then cooled to about 10° C. over approximately a four hour period with mild agitation and the resulting crystalline nystatin product isolated by centrifugation and washed with acetone. This step removes a large amount of impurities which are retained in solution, to yield a product which is about 80–85% pure.

EXAMPLE II

*General process.—Step 2*

In this step the nystatin product treated with sodium hexametapyrophosphate or equivalent sequestering agent as in Example I, is first dissolved in a methanolic salt solution. Water in the amount of about one-half of the volume of the methanolic salt-nystatin solution is then added (0.5 volume water to 1 volume methanolic solution) and the resulting aqueous solution filtered after adjustment of pH to 6±0.1 to remove insoluble material. The filtrate containing the nystatin as a nystatin-salt complex in solution is next adjusted to pH 5.3–5.5 and heated to about 50–55° C. Water in the amount of about the equivalent of the precut water volume (one-half the original methanolic solution volume) is then added and the nystatin which then crystallizes is recovered by filtration or like means.

In the first part of this step sufficient methanolic-salt solution should be added to dissolve all of the nystatin and in the last part of this step sufficient water should be added to the methanolic solution to decompose the solubilized nystatin-salt complex and crystallize all of the nystatin. A 2% (w./v.) methanolic calcium chloride solution employed in concentrations of about 15 ml. to one gram of nystatin has proven satisfactory. Other solutions, e. g. 1–5% (w./v.) methanolic calcium chloride or equivalent salt solutions, can also be employed with optimum amounts needed to solubilize the nystatin being readily ascertained by preliminary test. In the first part of this step the pH of the solution can be adjusted to about 5.9–6.1 prior to filtering and in the last part of this step the pH of the solution after addition of the water can be maintained at about 5.0–5.2 during crystallization to give some increase in purity and yield. While these adjustments are optional, the adjustment of the pH to 5.3–5.5 and the heating of the resulting solution to 50–55° C. prior to the addition of the water to effect decomposition of the complex and crystallization of the nystatin, is essential for an overall successful operation of the process.

*Specific example.—Step 2*

About 100 grams of dry product obtained in accordance with Example I is slurried in 1500 ml. of a 2% (w./v.) methanolic calcium chloride solution. The resulting mixture is agitated for about one-half hour to allow the active material to dissolve. About 750 cc. of water is next added with continued agitation over about a 5-minute period and the pH then adjusted to 6.0±0.1 with dilute hydrochloric acid. In the event the pH is or goes below 6.0 it should be readjusted to 6.0±0.1 by addition of 10% sodium hydroxide solution. The resulting mixture is then heated to about 45° C. over a period up to (not over) 15–20 minutes, cooled to about 25° C. with agitation over a one-hour period, filtered with a filter aid (e. g. Hyflo), the resulting cake washed with 65% aqueous methanol (about 7–8% of the original methanol-water volume) and the wash combined with the filtrate.

The pH of the combined filtrate and wash is next adjusted to 5.4±0.1 with dilute hydrochloric acid, the resulting mixture heated to about 50–55° C. with mild agitation over a period up to (not over) 15–20 minutes and a volume of water equivalent to the precut volume (about 750 cc.) added over a 10–15 minute period. The pH during the addition of the water and during crystallization following addition of the water will drop and should preferably be continuously readjusted to 5.1±0.1 with 10% sodium hydroxide solution. The mixture after addition of the water is subjected to mild agitation and cooled to about 25° C. over about a three-hour period and agitated for an additional two hours at this temperature. The crystalline product obtained is filtered off, washed with water, washed with acetone and then vacuum dried at 30° C. at reduced pressure of 5 mm. or less. The resulting nystatin product is a uniform substantially white crystalline material of high purity. It has been found to be much more readily soluble in solvents, notably propylene glycol, than crystalline materials previously available.

I claim:

1. In the process of preparing highly purified crystalline nystatin, the steps which comprise slurrying partially purified nystatin in 20–40% aqueous isopropanol containing about 0.3–3.0% of sodium hexametapyrophosphate and recovering the nystatin from the resulting slurry.

2. In the process of preparing highly purified crystalline nystatin, the steps which comprise slurrying partially purified nystatin of about a 65–70% purity in about 20% aqueous isopropanol containing about 0.5% sodium hexametapyrophosphate, warming the slurry to about 60° C., cooling the slurry and recovering the nystatin from the resulting cool slurry.

3. In the process of preparing highly purified crystalline nystatin, the steps which comprise dissolving the nystatin obtained by the process of claim 1 in a methanolic-calcium chloride solution, adding water to the resulting solution in the amount of about 0.5 volume water to 1 volume methanolic solution, adjusting the pH of the resulting aqueous-methanolic solution to about 5.9–6.1, filtering the resulting solution, adjusting the pH of the filtered solution to 5.3–5.5, heating the solution to about 50–55° C. for a period up to 15–20 minutes, adding water to the resulting solution in the amount about equivalent to the precut volume of water and recoevering crystalline nystatin from the resulting mixture.

4. The process which comprises slurrying partially purified nystatin of about a 65–70% purity in 20% aqueous isopropanol containing about 0.5% sodium hexametapyrophosphate, warming the slurry to about 60° C., cooling the slurry to about 10° C., recovering the nystatin from the slurry, dissolving the nystatin in a 2% methanolic-calcium chloride solution, adding water in the amount of about one-half of the volume of the methanolic solution, adjusting the pH of the resulting solution to 6.0±0.1, filtering the solution, adjusting the filtered solution to a pH of 5.4±0.1, heating the solution to 50–55° C. for a period up to 15–20 minutes, adding water in the amount about equivalent to the precut volume, adjusting and maintaining the pH of the solution to about 5.1±0.1, and recovering the nystatin crystallizing in the resulting mixture.

References Cited in the file of this patent

UNITED STATES PATENTS

| | | |
|---|---|---|
| 2,656,347 | Goett et al. | Oct. 20, 1953 |
| 2,658,078 | Blase | Nov. 3, 1953 |

OTHER REFERENCES

Harry: Modern Cosmetology, p. 344, pub. 1947, Chem. Publ. Co., Inc.